(12) United States Patent
Minami et al.

(10) Patent No.: US 7,857,162 B2
(45) Date of Patent: Dec. 28, 2010

(54) TABLET FEEDER

(75) Inventors: Tasuku Minami, Toyonaka (JP); Hiroshi Hashimoto, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 360 days.

(21) Appl. No.: 10/594,569

(22) PCT Filed: Mar. 25, 2005

(86) PCT No.: PCT/JP2005/005492
§ 371 (c)(1),
(2), (4) Date: Oct. 23, 2006

(87) PCT Pub. No.: WO2005/097600
PCT Pub. Date: Oct. 20, 2005

(65) Prior Publication Data
US 2008/0029537 A1  Feb. 7, 2008

(30) Foreign Application Priority Data
Mar. 31, 2004  (JP) ............... 2004-107366

(51) Int. Cl.
G07F 11/00 (2006.01)
B65H 3/00 (2006.01)
B23Q 7/12 (2006.01)
B65H 9/00 (2006.01)

(52) U.S. Cl. .................. 221/82; 221/122; 221/168; 221/2; 221/165; 221/263; 221/264; 221/119

(58) Field of Classification Search .......... 221/82, 221/122, 2, 265, 263, 264, 119
See application file for complete search history.

(56) References Cited
U.S. PATENT DOCUMENTS 5,074,824 A * 12/1991 Suris .................. 453/57
5,803,309 A * 9/1998 Yuyama et al. .......... 221/82

(Continued)

FOREIGN PATENT DOCUMENTS

CN 2577982 10/2003

(Continued)

OTHER PUBLICATIONS

European Search Report issued May 21, 2008 in European Application No. EP 05721469.

(Continued)

Primary Examiner—Gene O. Crawford
Assistant Examiner—Rakesh Kumar
(74) Attorney, Agent, or Firm—Wenderoth, Lind & Ponack, L.L.P.

(57) ABSTRACT

A tablet feeder including a tablet accommodating section (4) capable of accommodating a multiplicity of tablets A; a tablet array member (8) which is disposed in the tablet accommodating section (4) and which, while being driven and rotated, retains the tablets A one after another in pockets (11) formed in an outer periphery thereof and discharges the tablets at a discharge position; and a partitioning member (13) whose partitioning portion (14) having a shape of a brush partitions the pocket (11) so that the upper tablets A do not fall into the lower pocket (11). Thereby, the tablets A that are retained in the pocket (11) of the tablet array member (8) are discharged in a predetermined number. The partitioning member (13) includes a plurality of brush elements (15a, 15b) constituting a partitioning portion (14). At least part of the brush elements (15a) each has a tip that is bent in a U-shape. Thus, deformation of the brush elements (15a), constituting the partitioning member (13), can be surely prevented.

9 Claims, 6 Drawing Sheets

U.S. PATENT DOCUMENTS

| | | | |
|---|---|---|---|
| 6,073,799 A * | 6/2000 | Yuyama et al. | 221/154 |
| 6,394,308 B1 * | 5/2002 | Yuyama et al. | 221/265 |
| 6,510,676 B1 * | 1/2003 | Gauthier | 53/501 |
| 7,255,247 B2 * | 8/2007 | Aylward | 221/168 |

FOREIGN PATENT DOCUMENTS

| | | |
|---|---|---|
| JP | 63-31944 | 2/1988 |
| JP | 2-205523 | 8/1990 |
| JP | 9-39910 | 2/1997 |
| JP | 2002-6585 | 1/2002 |
| JP | 2002006585 A * | 1/2002 |

OTHER PUBLICATIONS

Chinese Office Action (in English language) issued May 30, 2008.
European Official Communication (in English language), issued Sep. 19, 2008.

* cited by examiner

TABLET FEEDER

BACKGROUND OF THE INVENTION

1. Technical Field

The present invention relates to a tablet feeder and in particular to a tablet feeder featuring a partitioning member that restrains tablets discharged from a pocket portion of a tablet array member.

2. Description of Related Art

Prior art document information relating to the tablet feeder of the present invention is as follows.

Japanese patent Laid-open publication H2-205523

Japanese patent Laid-open publication H9-39910

Japanese patent Laid-open publication H2-205523 discloses a tablet feeder arranged so that a tablet accommodating section in which a plurality of tablets are accommodated is mounted on a motor base in which a motor is housed, and that a tablet array member disposed in the tablet accommodating section is rotated by the motor so that the tablet can be discharged outside. Specifically, on the outer periphery of the tablet array member accommodated in the tablet accommodating section, a plurality of pockets are defined so as to be recessed along the direction of the rotational axis at specified intervals, so that the tablets in the tablet accommodating section are fed one after another to the pockets. In the pockets, the tablets vertically arrayed are partitioned by a partitioning member as the tablet array member rotates. Thus, the feeder is able to discharge out only the lower side one of the tablets retained in the pocket through a tablet discharge hole.

However, in the above tablet feeder, the partitioning member is made of a thin metal plate, and is disposed at a portion of the outer periphery of the tablet array member. For this reason, although there occurs no problem if the tablets in the pockets are arrayed properly, there are some cases where the tablets, if they have been caught halfway, are not partitioned well by the partitioning member. That is, because the partitioning member will go beyond the caught tablet, the tablet may be sandwiched between the partitioning member and the tablet array member so that the tablet may be damaged or chipped, or in some cases, the partitioning member may be deformed. This would cause a problem in that the tablets could not be discharged properly through the tablet discharge hole.

In order to solve the problems, in Japanese patent Laid-open publication H9-39910 each partition portion of the partitioning member is formed into a shape of a brush. Once the brush constituting the partitioning member is bent due to contact with the tablet, the brush is elastically returned to the original state, thereby allowing the tablets to be smoothly partitioned into upper and lower tablets. Thus, the tablets are never be damaged, chipped or cracked and the partitioning member itself does not become damaged even if a tablet has been caught halfway in the pocket.

However, in the tablet feeder described in Japanese patent Laid-open publication H9-39910, there is the disadvantage that since the partitioning member is made of resin, the partition portions can become deformed and, if worst comes to worst, this can lead to damage while repeating the elastic deformation due to contact with the tablets. In this case, there is a problem that a large gap is formed between the brush elements constituting the brush so that a plurality of tablets drops through the gap, thereby degrading the accuracy of discharging (feeding) tablets.

SUMMARY OF THE INVENTION

The present invention has been developed to substantially eliminate the above-described disadvantages. It is an object of the present invention to provide a tablet feeder that will surely prevent deformation of the brush constituting the partitioning member.

In order to achieve the aforementioned object, a tablet feeder constructed in accordance with the present invention is provided. The tablet feeder comprises: a tablet accommodating section capable of accommodating a multiplicity of tablets;

a tablet array member which is disposed in the tablet accommodating section and which, while being driven and rotated, retains the tablets one after another in pockets defined on an outer periphery thereof and discharges them at a discharge position; and a partitioning member whose partitioning portion having a shape of brush partitions the pocket so that the upper tablets do not fall into the lower pocket, thereby the tablets retained in the pocket of the tablet array member are discharged by a predetermined number, the tablet feeder being characterized in that;

at least part of brush element among the brush elements constituting the partitioning portion of the partitioning member has a tip bent in a U-shape.

Preferably, the brush elements constituting the partitioning portion may be tilted toward a downstream side of the rotational direction of the tablet array member.

Preferably, the brush elements constituting the partitioning portion may have their cross section formed into a generally oval shape, and its minor axis may be directed along the rotational direction of the tablet array member.

Preferably, the brush elements constituting the partitioning portion may comprise a plurality of filaments which are arranged together and form a U-shaped tip.

In the tablet feeder of the present invention, as the partitioning portion is formed in a shape of a brush, the partitioning portion, after once bent under contact with the tablets, can partition the tablets into a predetermined number of tablets without any difficulty. Accordingly, there is no possibility that the tablets may be damaged, chipped, or cracked. Also, as at least part of the brush element among the brush elements constituting the partitioning portion of the partitioning member which restrains tablets so as to be discharged by a predetermined number has a tip bent in a U-shape, it is possible to increase an elastic restoring force when the brush element is deflected due to contact with the tablet and released from the pressure. Therefore, it is prevented that the brush is plastically deformed into a partly deformed state as it is used.

In addition, as the brush constituting the partitioning member are tilted toward the downstream of the rotational direction of the tablet array member, or the brush is formed into a generally oval shape with its minor axis directed along the rotational direction of the tablet array member, the brush will make contact with the tablets and be elastically deformed smoothly in a certain direction, so that the tablets can be separated more appropriately.

EXPLANATION OF REFERENCE NUMERALS 4 tablet accommodating section
6 tablet discharge hole
8 tablet array member
11 pocket
13 partitioning member
14 partitioning portion
15a, 15b brush element
16 fixing portion
A tablet

DETAILED DESCRIPTION OF THE INVENTION

Embodiments of the present invention will be described hereinafter.

Figure 1:
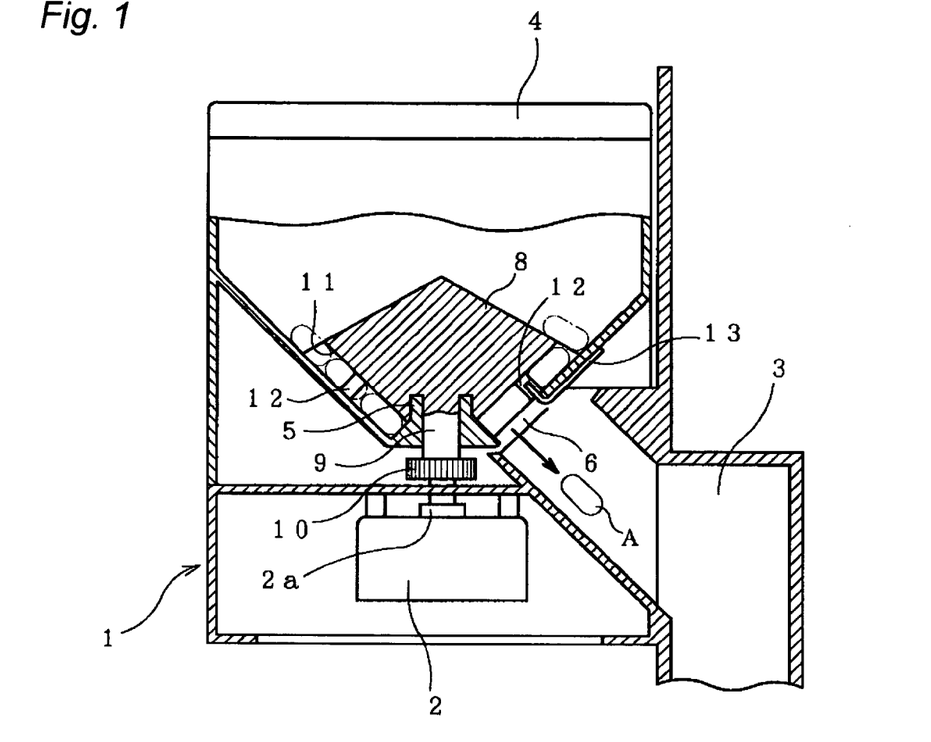
FIG. 1 is a sectional view of a tablet feeder according to the present invention.
Figure 2:
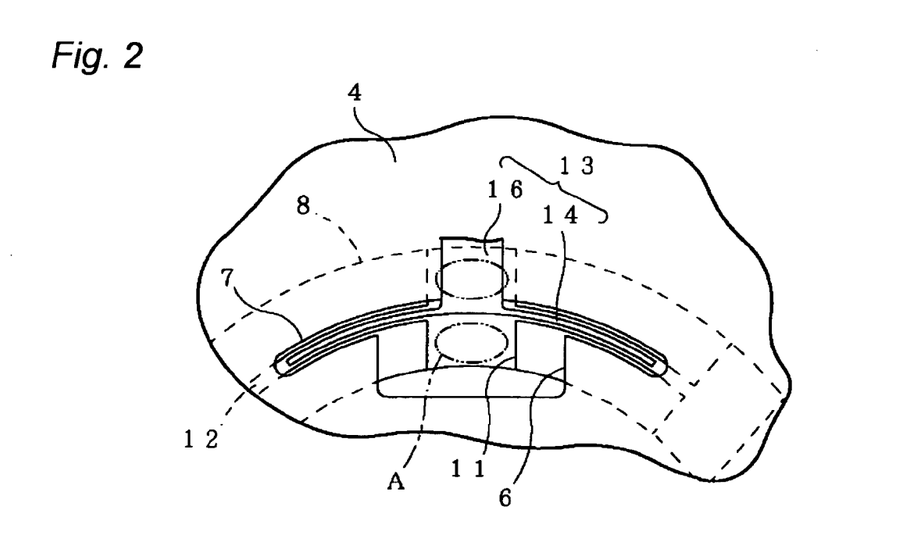
FIG. 2 is an enlarged partial bottom view of tablet accommodating section of FIG. 1.

FIG. 1 shows a tablet feeder according to an embodiment of the present invention. This tablet feeder generally comprises a motor base 1 and a tablet accommodating section 4 provided above the motor base 1. In the motor base 1, a motor 2 is contained and a discharge path 3 for discharging tablets A out is provided on back side. The tablet accommodating section 4 has a bottom surface formed into a generally conical shape with the cross sectional area gradually decreasing downward, and a cylindrical boss 5 is provided in the center of the bottom surface so as to protrude upward. In proximity to the outer periphery of the boss 5, a tablet discharge hole 6 is bored so as to communicate with the discharge path 3. This tablet discharge hole 6 has at least such a size that one of the tablets A accommodated in pockets 11 of the tablet array member 8, as will be described below, are allowed to drop. Also, the accommodating section 4 has slits 7 formed by the upper inner edge of the tablet discharge hole 6 being cut out circumferentially, as shown in FIG. 2.

In the center of the bottom surface of the tablet accommodating section 4, a tablet array member 8 is disposed rotatably about the boss 5. The tablet array member 8 has a circular shape, its lower surface being formed into a generally conical shape that corresponds to the shape of the bottom surface of the tablet accommodating section 4 and its upper surface also being formed into a conical shape. In the center of the lower surface of the tablet array member 8, a swivel 9, which is received in the boss 5, is protrudingly provided. A gear 10, attached at the lower end of the swivel 9, is engaged with a gear (not shown) provided on a rotating shaft 2a of the motor 2, by which rotating force of the motor 2 is transferred to the tablet array member 8. On the lower surface of the tablet array member 8, a plurality of pockets 11 are formed at equal angles to the circumferential direction, each pocket 11 has such a size that two pieces of tablets A arrayed longitudinally one-by-one can be accommodated therein. Between adjacent pockets 11, a thin-width recess 12 is defined circumferentially on a site corresponding to an intermediate position of the tablets A accommodated in each pocket 11.

Figure 3:
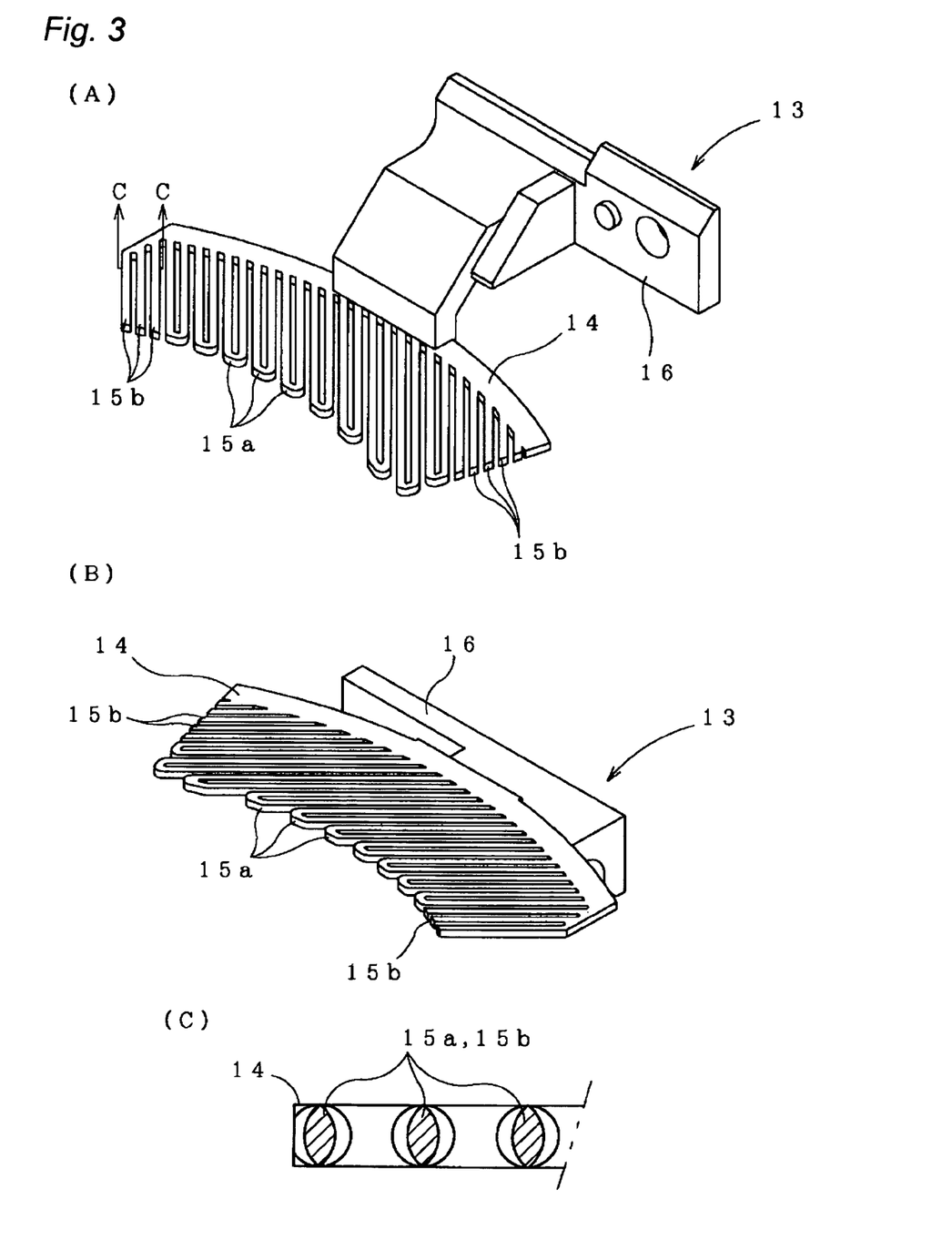
FIGS. 3A, 3B are perspective views of the partitioning member to be used in the tablet feeder
FIG. 3C is a sectional view of FIG. 3A along C-C line.

On the bottom outer surface of the tablet accommodating section 4, a partitioning member 13 is fixed. The partitioning member 13 is made of a synthetic resin material such as polyacetal, and comprises a partitioning portion 14 and a fixing portion 16 as shown in FIGS. 3A and 3B. The partitioning portion 14 has generally a shape of a brush 9 (or comb) and is tilted toward the downstream in the rotational direction of the tablet array member 8. Among a plurality of brush elements 15a, 15b having elasticity and constituting the brush of the partitioning portion 14, most of the brush elements 15a positioned at the middle of the partitioning portion 14 have a linear shape with a tip bent in a U-shape. The brush elements 15b positioned at both ends of the partitioning portion 14 have a linear shape extending like a straight line. In a state in which the partitioning member 13 is attached to the tablet accommodating portion 14, the partitioning portion 14 is projecting into the tablet accommodating section 4 via the slits 7 defined in the bottom surface of the tablet accommodating section 4 so that the tablets A retained in the pocket 11 of the tablet array member 8 are divided into the lowermost tablet A and the upper tablets A. Each of the brush elements 15a, 15b has a cross section formed into a generally oval shape as shown in FIG. 3C, and the elements are arrayed along the minor axes thereof at a predetermined interval. Thus, with the partitioning member 13 mounted to the tablet accommodating section 4, each of the brush elements 15a, 15b will easily be elastically deformed only along the direction of the minor axis, i.e., toward the downstream of the rotational direction of the tablet array member 8. The tips of the brush elements 15a, 15b are arranged in a circular arc shape along the outer cylindrical surface of the tablet array member 8.

Figure 4:
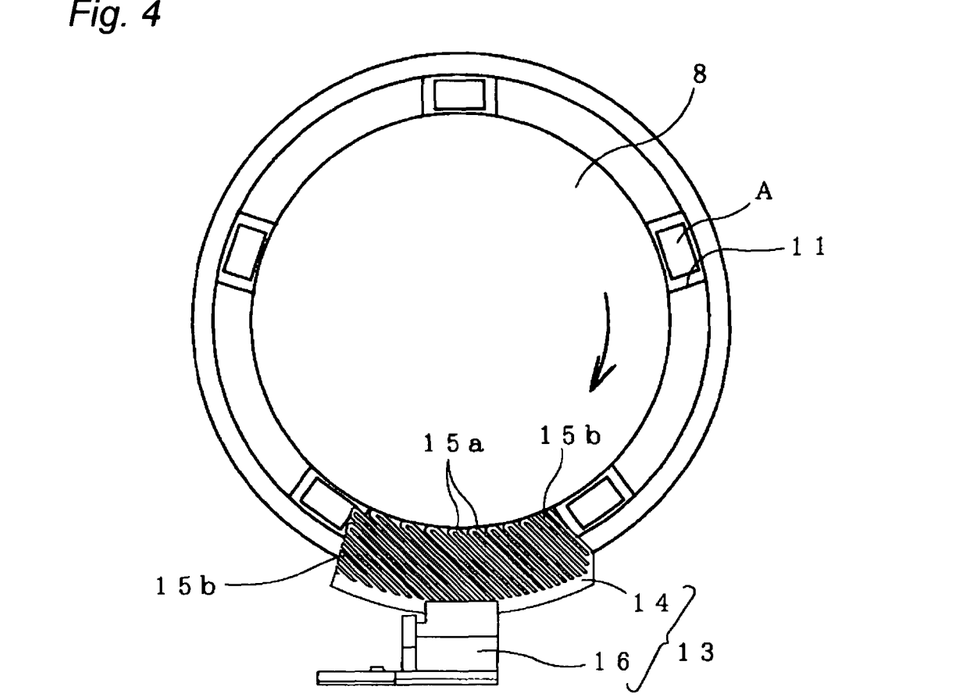
FIG. 4 is a plan view showing a state in which the tablets located in a pocket of the tablet array member are partitioned by the partitioning member.

The tablet feeder with the construction described above is used to take out the tablets A accommodated in the tablet accommodating section 4 one-by-one (one in this embodiment, but 2 or more are possible). More specifically, the tablets A accommodated in the tablet accommodating section 4 are retained in each of the pockets 11 of the tablet array member 8 in such a state that two tablets A are arrayed and directed downward. In this state, upon rotation of the tablet array member 8, the partitioning portion 14 of the partitioning member 13 enters between the two tablets A of each pocket 11 along with the rotation. The partitioning portion 14 is composed of a plurality of brush elements 15a, 15b projecting obliquely, and each of the brush elements 15a, 15b is projecting obliquely toward the downstream of the rotational direction of the tablet array member 8. Therefore, the brush element 15b located most upstream with respect to the rotational direction of the tablet array member 8 first makes contact with a tablet A. The brush elements 15a, 15b, which are all projecting in the same direction, are gradually bent under press contact with the tablet A as the tablet array member 8 rotates, and the brush elements are elastically deformed smoothly, as shown in FIG. 4. In this way, the number of brush elements 15a, 15b which are elastically deformed is increased so that the pressing force of the tablets A increases gradually. Thus, the tablets A within the pockets 11 are divided into a single lower tablet and upper tablets A without any difficulty, and the upper tablets A are restrained from falling into the lower pocket 11. Accordingly, flaws or cracks will never occur in the tablets A. Also, even if a tablet A is caught halfway in the pocket 11 such that the partitioning portion 14 of the partitioning member 13 passes the intermediate portion of the tablet A, the brush elements 15a, 15b will be elastically deformed so that flaws or cracks of the tablet A will never occur, and breakage of the partitioning member 13 will never occur.

Also, in the present embodiment, the brush element 15a constituting the intermediate brush of the partitioning portion 14 has a tip formed in a U-shape, it is possible to increase an elastic restoring force when the brush element is deflected due to contact with the tablet and released from the pressure. Therefore, the brush is prevented from being plastically deformed as it is used.

The tablet feeder of the present invention is not limited to the construction of the above embodiment but may be changed in various ways.

For example, the above embodiment has been described in a case in which the partitioning member 13 according to the present invention is applied to a tablet feeder having pockets 11 defined in the lower surface of the conical tablet array member 8. However, it may also be applied, of course, to such tablet feeders as shown in FIGS. 5 and 6.

Figure 5:
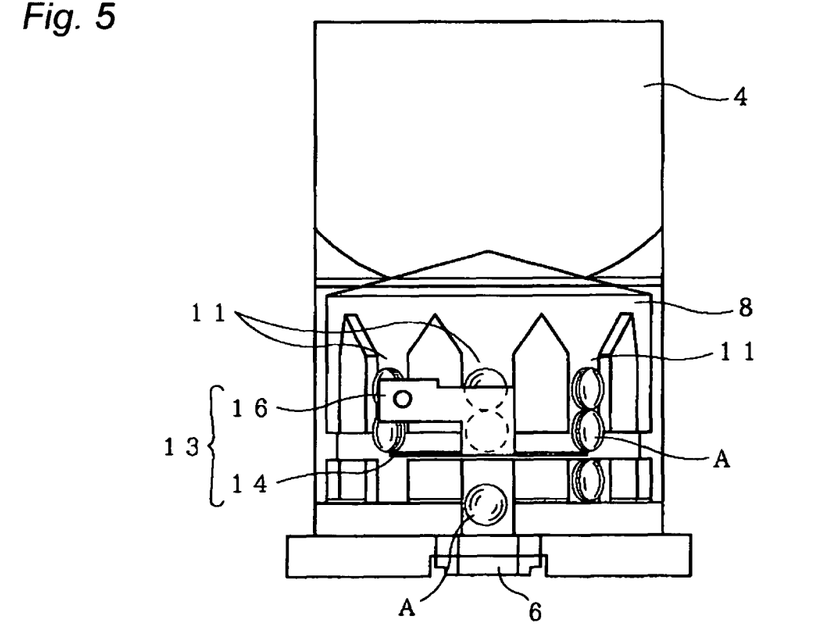
FIG. 5 is a front view showing a tablet feeder of another arrangement.

Specifically, in the tablet feeder shown in FIG. 5, a columnar tablet array member 8 is rotatably accommodated in a cylindrical tablet accommodating section 4, and a plurality of pockets 11 are defined on the cylindrical surface of the tablet array member 8 so as to extend in a vertical direction. In this tablet feeder, in which the tablets A are arrayed in a line along the vertical direction within the pockets 11, the tablets A can be divided by using the partitioning member 13 without causing flaws or cracks in the tablets A as in the foregoing embodiment, where the partitioning member 13 itself also will never lead to breakage.

Figure 6:
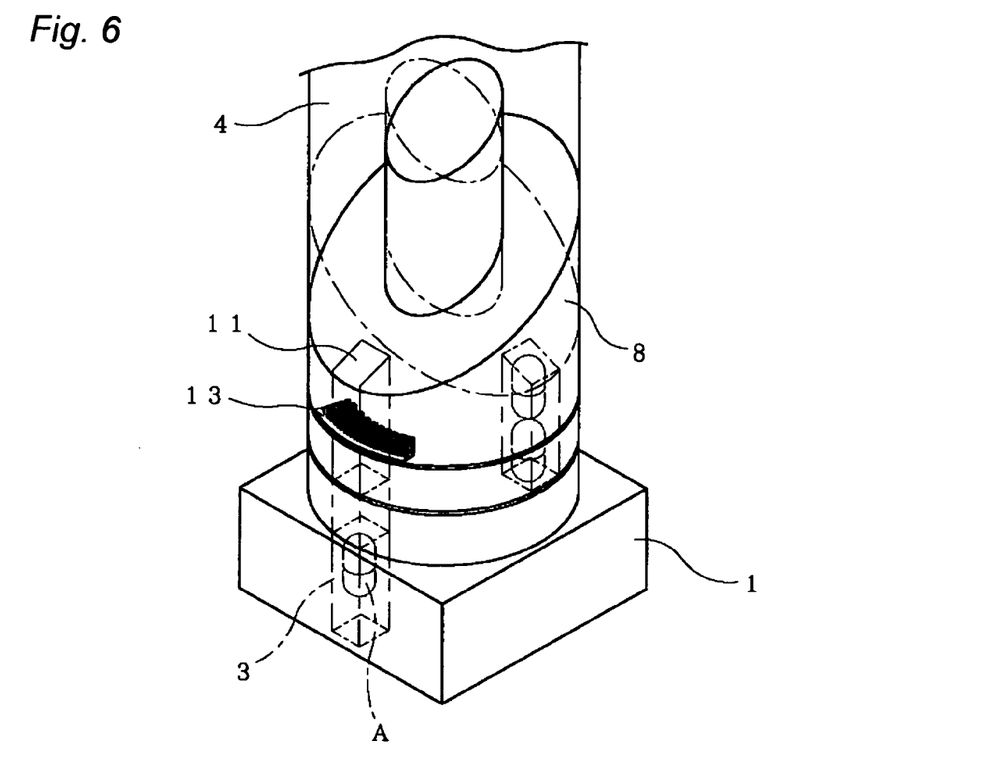
FIG. 6 is a front view showing a tablet feeder of still another arrangement.

In the tablet feeder as shown in FIG. 6, a columnar tablet array member 8 is rotatably accommodated in a cylindrical tablet accommodating section 4, and has at its top end a tilted surface 8a, where a pocket 11 is provided only at one place, the lowermost place of the tilted surface 8a. Tablets A accommodated in the tablet accommodating section 4 are introduced to the pocket 11 by the tilted surface 8a, and thereafter, upon reaching a discharge position, they are divided by the partitioning member 13 so that the upper tablets A do not fall into the lower pocket 11. This tablet feeder can also produce the same effects as the foregoing embodiments by virtue of the partitioning member 13.

The pocket 11 does not always retain more than 2 tablets A but may retain only one tablet A.

Figure 7:
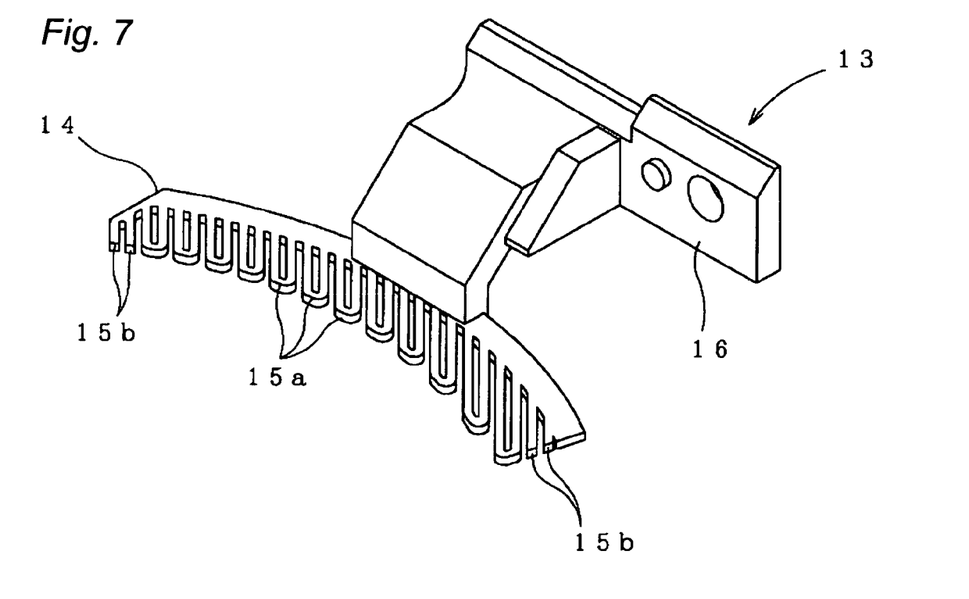
FIG. 7 is a perspective view showing a construction of another partitioning member.
Figure 8:
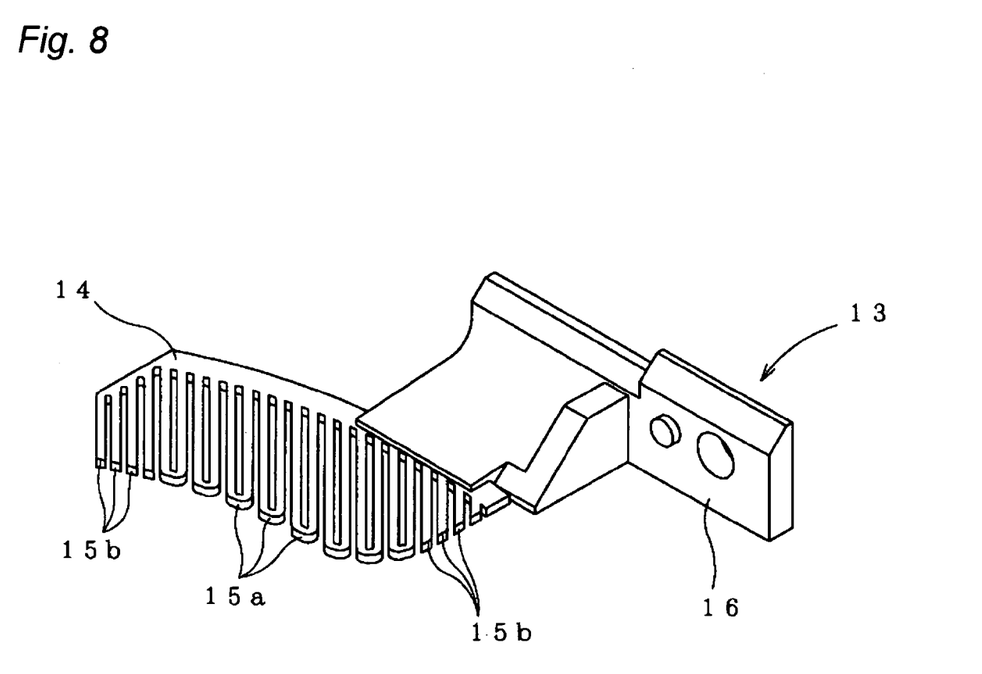
FIG. 8 is a perspective view showing a construction of still another partitioning member.

Also, the partitioning member 13 used in each of the aforementioned tablet feeders is not limited to the above construction. For example, as shown in FIG. 7, the brush elements 15a, 15b may be formed so that the protrusion dimension becomes reduced in accordance with the distance to the outer cylindrical surface of the tablet array member 8. In the aforementioned embodiment, the partitioning portion 14 is formed so as to protrude from both sides of the fixing portion 16, though the partitioning portion 14 may be formed so as to protrude from one side of the fixing portion 16. The construction of the fixing portion 16 may be changed in various ways in accordance with the construction of each tablet feeder.

In the aforementioned embodiments, the brush elements 15a having the U-shaped tips are provided at the intermediate portion of the partitioning portion 14 and the brush elements 15b having a linear shape are provided at both sides of the partitioning portion 14, though all brush elements may be formed by the brush elements 15a having the U-shaped tips.

Figure 9:
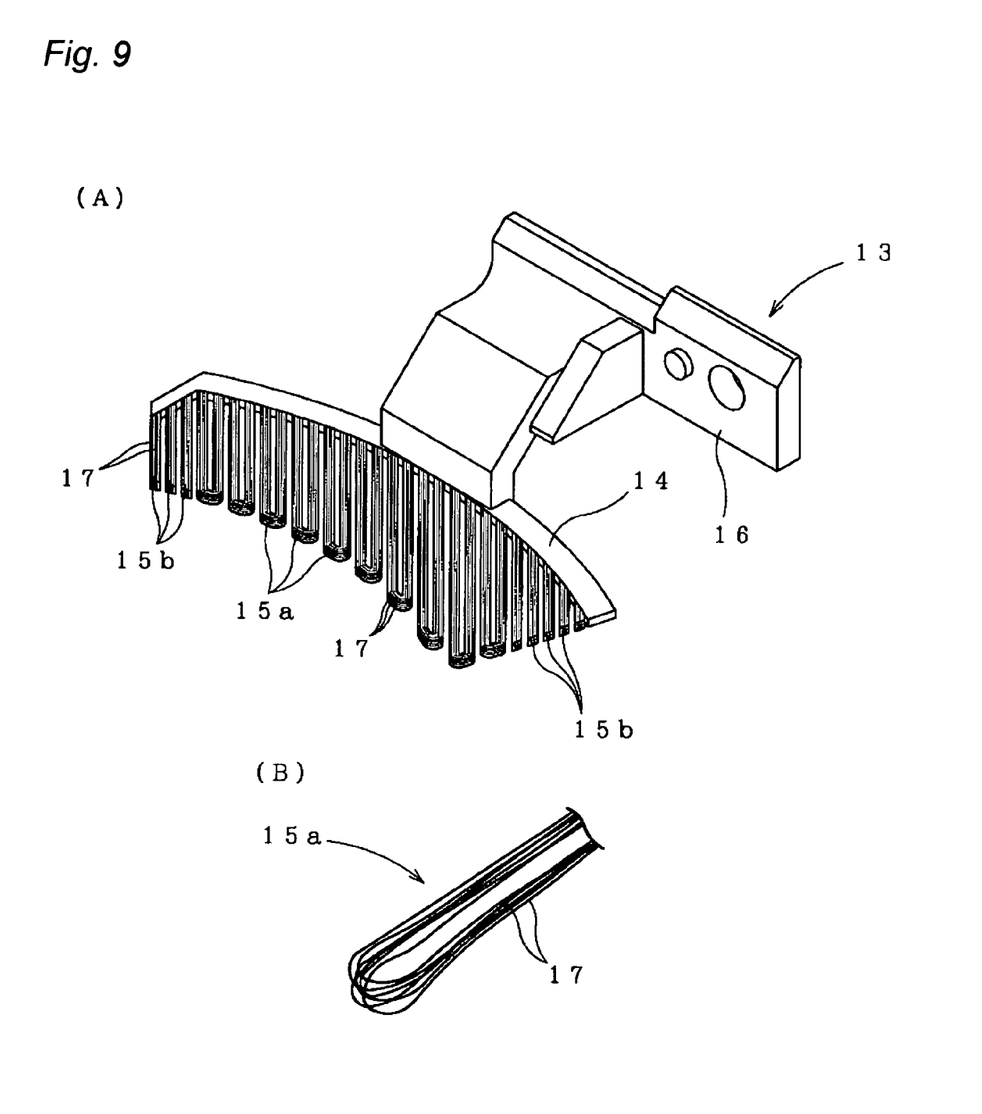
FIG. 9A is a perspective view showing a construction of still another partitioning member and FIG. 9B is an enlarged perspective view of its substantial part.

In the aforementioned embodiments, each of the brush elements 15a, 15b of the partitioning portion 14 is constituted by single linear member, though the brush element may be constituted by a bundle of filaments, i.e., a plurality of filaments 17 which are held together as shown in FIGS. 9A, 9B. In particular, the brush elements 15a of the partitioning portion 14 may be formed of a plurality of filaments 17 which are held together and form a tip bent in a U-shape. Thus, as the cross sectional area of each filament becomes reduced, it is possible to further eliminate the problem of the tablet A being damaged and the problem of the brush, constituting the partitioning portion 14, being deformed.

What is claimed is:

1. A tablet feeder comprising:
   a tablet accommodating section capable of accommodating a multiplicity of tablets;
   a tablet array member which is rotatably disposed in the tablet accommodating section and which, while being driven and rotated, retains the tablets one after another in pockets defined in an outer periphery thereof such that the tablets can be discharged at a discharge position; and
   a partitioning member including a fixing portion and a partitioning portion having a plurality of brush elements that extend from the fixing portion and terminate in ends,
   the partitioning portion being disposed in the vicinity of the discharge position so as to partition the pocket at the discharge position and enter between upper tablets and a lower tablet so that the upper tablets are prevented from falling into a lower portion of the pocket, and thereby the tablets retained in the pockets of the tablet array member are discharged by a predetermined number,
   wherein at least two adjacent brush elements, among the brush elements constituting the partitioning portion of the partitioning member, are connected at the ends thereof so as to form a U-shaped tip portion.

2. The tablet feeder according to claim 1, wherein at least one of the brush elements located at an end of the partitioning portion is a linear member.

3. The tablet feeder according to claim 1, wherein the brush elements are tilted toward a downstream side relative to a rotational direction of the tablet array member.

4. The tablet feeder according to claim 1, wherein each of the brush elements has a cross section that is generally oval shape, and a minor axis of the oval shape is directed along the rotational direction of the tablet array member.

5. The tablet feeder according to claim 1, wherein each of the brush elements comprises a plurality of filaments that are held together so as to form the U-shape and the rounded tip.

6. A tablet feeder comprising:
   a tablet accommodating section capable of accommodating a multiplicity of tablets;
   a tablet array member which is rotatably disposed in the tablet accommodating section and which, while being driven and rotated, retains the tablets one after another in pockets defined in an outer periphery thereof such that the tablets can be discharged at a discharge position; and
   a partitioning member fixed on a bottom outer surface of the table accommodating section, the partitioning member including a fixing portion and a partitioning portion having a plurality of linear elements having elasticity,
   the partitioning portion projecting into the tablet accommodating section in the vicinity of the discharge position so as to partition the pocket at the discharge position and enter between upper tablets and a lower tablet so that the upper tablets are prevented from falling into a lower portion of the pocket, and thereby the tablets retained in the pockets of the tablet array member are discharged by a predetermined number,
   wherein at least two adjacent linear elements, among the plurality of linear elements constituting the partitioning portion of the partitioning member, are connected at ends thereof that are remote from the fixing portion to form a U-shaped tip portion.

7. The tablet feeder according to claim 6, wherein the linear elements are tilted toward a downstream side relative to a rotational direction of the tablet array member.

8. The tablet feeder according to claim 6, wherein each of the linear elements has a cross section that is generally oval shape, and a minor axis of the oval shape is directed along the rotational direction of the tablet array member.

9. The tablet feeder according to claim 6, wherein each of the linear elements comprises a plurality of filaments that are held together so as to form the U-shape and the rounded tip.

* * * * *